(12) United States Patent
Hidaka

(10) Patent No.: US 9,163,917 B2
(45) Date of Patent: Oct. 20, 2015

(54) LEVER HEAD

(71) Applicant: MITUTOYO CORPORATION, Kawasaki, Kanagawa (JP)

(72) Inventor: Kazuhiko Hidaka, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 135 days.

(21) Appl. No.: 14/054,176

(22) Filed: Oct. 15, 2013

(65) Prior Publication Data
US 2014/0109423 A1  Apr. 24, 2014

(30) Foreign Application Priority Data

Oct. 18, 2012 (JP) ................... 2012-230815

(51) Int. Cl.
*G01B 5/016* (2006.01)
*G01B 3/00* (2006.01)

(52) U.S. Cl.
CPC ............... *G01B 3/002* (2013.01); *G01B 5/016* (2013.01)

(58) Field of Classification Search
CPC ........ G01B 5/012; G01B 5/016; G01B 7/012; G01B 7/016
USPC .................................... 33/559, 556
See application file for complete search history.

(56) References Cited

U.S. PATENT DOCUMENTS

| | | | | |
|---|---|---|---|---|
| 3,869,799 A | * | 3/1975 | Neuer et al. | 33/561 |
| 3,936,946 A | * | 2/1976 | Ruffner et al. | 33/556 |
| 3,945,124 A | * | 3/1976 | Jacoby et al. | 33/559 |
| 4,451,988 A | * | 6/1984 | McMurtry | 33/572 |
| 4,879,916 A | * | 11/1989 | Juillerat | 73/865.8 |
| 5,048,194 A | * | 9/1991 | McMurtry | 33/558 |
| 5,119,568 A | * | 6/1992 | Vesco et al. | 33/559 |
| 5,129,152 A | * | 7/1992 | Barr | 33/503 |
| 5,357,684 A | * | 10/1994 | Lindner et al. | 33/559 |
| 5,623,766 A | * | 4/1997 | Ruck et al. | 33/561 |

(Continued)

FOREIGN PATENT DOCUMENTS

EP  2 251 635 A2  11/2010
JP  U-53-121045   9/1978

(Continued)

OTHER PUBLICATIONS

Kyusojin et al., "Development of Linear and Rotary Movement Mechanisms by Using Leaf Springs," *JSPE*, Jul. 1987, vol. 53, No. 7, pp. 1092-1096 (with English Abstract and partial translation).

*Primary Examiner* — Christopher Fulton
(74) *Attorney, Agent, or Firm* — Oliff PLC

(57) ABSTRACT

A stylus support member extends in a first direction. A first and second elastic body attaching members are spaced aside from each other in a second direction are arranged spaced aside from the stylus support member in the first direction, and are connected to each other by first and second members. A first elastic body is arranged between a holder and the first elastic body attaching member. A second elastic body is arranged between a first member and the first elastic body attaching member. A third elastic body is arranged between a second member and the second elastic body attaching member. A fourth elastic body is arranged between the holder and the second elastic body attaching member. A detector detects displacement in the second direction of the stylus support member. The first to fourth elastic members perform lever motion of a single degree of freedom.

8 Claims, 13 Drawing Sheets

(56) References Cited

U.S. PATENT DOCUMENTS

| | | |
|---|---|---|
| 6,886,265 B2 * | 5/2005 | Fracheboud et al. ........... 33/559 |
| 2002/0124427 A1 | 9/2002 | Nishimura et al. |
| 2004/0128848 A1 | 7/2004 | Szenger et al. |
| 2005/0022409 A1 | 2/2005 | Yamamoto et al. |
| 2010/0299946 A1 | 12/2010 | Kawabata et al. |

FOREIGN PATENT DOCUMENTS

| | | | |
|---|---|---|---|
| JP | 07324924 A | * | 12/1995 |
| JP | 08304057 A | * | 11/1996 |
| JP | 08304059 A | * | 11/1996 |
| JP | 2006170901 A | * | 6/2006 |
| JP | A-2006-220496 | | 8/2006 |

* cited by examiner

LEVER HEAD

INCORPORATION BY REFERENCE

This application is based upon and claims the benefit of priority from Japanese patent application No. 2012-230815, filed on Oct. 18, 2012, the disclosure of which is incorporated herein in its entirety by reference.

BACKGROUND OF THE INVENTION

1. Field of the Invention

The present invention relates to a lever head and, for example, to a direct acting type lever head.

2. Description of Related Art

As a probe of a measuring machine that performs three-dimensional shape measurement of a measurement object, for example, a lever head has been widely used. When a three-dimensional shape is measured using the lever head, a stylus tip is made to scan the lever head while being in contact with the measurement object. A displacement amount of the scanning stylus tip is then detected, and thereby an outline of the three-dimensional shape of the measurement object can be acquired.

As an example of such lever head, a leverage-type detector that can switch a measurement direction is proposed (Japanese Unexamined Utility Model Application Publication No. 53-121045). In the leverage-type detector, a base of a lever is joined to a rotating body, and the lever performs rotational motion centering on an axis of rotation of the rotating body. Therefore, the stylus tip is displaced following an arc-like orbit.

SUMMARY OF THE INVENTION

However, the inventor has found out that there is a problem that will be explained hereinafter in the above-mentioned technique. FIG. 13 is a view schematically showing a relation between an orbit and a displacement direction of a stylus tip of a leverage-type detector. In the above-mentioned leverage-type detector, a tip of a stylus 60 follows the arc-like orbit. Therefore, in measuring an object to be measured, displacement in a tangential direction of a circumference (a Y direction) and displacement in a radial direction of a circle (an X direction) occur. FIG. 13 shows an example where the stylus 60 has rotated only by an angle θ centering on an axis of rotation 61 when a measuring force F is applied.

In the configuration, when only displacement in one direction (for example, the Y direction of FIG. 13) is detected, an accurate shape of the measurement object cannot be measured. In addition, when displacement in two directions is detected, a complex displacement detection mechanism must be mounted at the lever head and further, arithmetic processing must be performed based on the displacement in the two directions. Therefore, the above-mentioned technique causes increase in size and higher cost of the lever head.

A lever head of a first aspect of the present invention is provided with a holder; a stylus support member that extends in a first direction; a stylus that is fixed to the stylus support member, and extends in a second direction; a first elastic body attaching member that is arranged spaced aside from the stylus support member in the second direction; a second elastic body attaching member that is arranged spaced aside from the stylus support member in the second direction, and is arranged spaced aside from the first elastic body attaching member in the first direction; a connecting member that connects the first and second elastic body attaching members to fix relative positions of the first and second elastic body attaching members; a first elastic body whose one end is fixed to the holder, and whose other end is joined to a first attaching position of the first elastic body attaching member; a second elastic body whose one end is joined to a first joining position of the stylus support member, and whose other end is joined to a second attaching position opposed to the first attaching position in the first direction through the first elastic body attaching member; a third elastic body whose one end is joined to a second joining position spaced aside from the first joining position of the stylus support member in the first direction, and whose other end is joined to a third attaching position of the second elastic body attaching member; a fourth elastic body whose one end is fixed to the holder, and whose other end is joined to a fourth attaching position opposed to the third attaching position in the first direction through the second elastic body attaching member; and a detector that detects displacement in the first direction of the stylus support member, in which the first to fourth elastic bodies perform lever motion of a single degree of freedom with a third direction perpendicular to the first and second directions being set as an axis. As a result of this, can be obtained a direct acting type lever head in which motion of the stylus support member is limited only in the first direction.

A lever head of a second aspect of the present invention is the above-described lever head, in which the first and second elastic bodies, and the first elastic body attaching member are included in a first folded hinge, and the third and fourth elastic bodies, and the second elastic body attaching member are included in a second folded hinge. As a result of this, motion of the stylus support member can be limited only in the first direction.

A lever head of a third aspect of the present invention is the above-described lever head, in which the stylus support member is provided with: a first member that extends in the first direction; a second member that projects in a second direction from one end of the first member; and a third member that projects in the same direction as the second member from the other end of the first member, and in which the first elastic body is joined to a surface on a side of the third member of the second member, and in which the third elastic body is joined to a surface of the third member on an opposite side of the second member. As a result of this, a structure can be configured in which motion of the stylus support member can be limited only in the first direction.

A lever head of a fourth aspect of the present invention is the above-described lever head, in which the stylus support member is provided with: a first member that extends in the first direction; a second member that projects in a second direction from one end of the first member; and a third member that projects in the same direction as the second member from the other end of the first member, and in which the first elastic body is joined to a surface of the second member on an opposite side of the third member, and in which the third elastic body is joined to a surface of the third member on an opposite side of the second member. As a result of this, the structure can be configured in which motion of the stylus support member can be limited only in the first direction.

A lever head of a fifth aspect of the present invention is the above-described lever head, in which the stylus support member is provided with a first member extending in the first direction, and in which the first elastic body is joined to one end of the second member, and in which the third elastic body is joined to the other end of the third member. As a result of this, the structure can be configured in which motion of the stylus support member can be limited only in the first direction.

A lever bead of a sixth aspect of the present invention is the above-described lever head, in which the first and second elastic body attaching members extend in the third direction, and in which the connecting member extends in the first direction and connects the first and second elastic body attaching members. As a result of this, rotational motion of the first and second elastic body attaching members is prevented, and the structure can be configured in which motion of the stylus support member is limited only in the first direction.

A lever head of a seventh aspect of the present invention is the above-described lever head, and is provided with a first connecting member that is the connecting member, in which the first connecting member connects a first end of the first elastic body attaching member, and a second end of the second elastic body attaching member corresponding to the first end. As a result of this, rotational motion of the first and second elastic body attaching members is prevented, and the structure can be configured in which motion of the stylus support member is limited only in the first direction.

A lever head of an eighth aspect of the present invention is the above-described lever head, and is further provided with a second connecting member that is the connecting member, in which the second connecting member connects a third end of the first elastic body attaching member on an opposite side of the first end, and a fourth end of the second elastic body attaching member corresponding to the third end, and in which formed is a hollow portion surrounded by the first and second elastic body attaching members, and the first and second connecting members. As a result of this, rotational motion of the first and second elastic body attaching members is prevented, and the structure can be configured in which motion of the stylus support member is limited only in the first direction.

A lever head of a ninth aspect of the present invention is the above-described lever head, in which the detector is configured as a cantilever that penetrates through the hollow portion to extend in the second direction, the cantilever being fixed to the holder. As a result of this, displacement of the stylus support member that moves in the first direction can be detected, and shape measurement of a measurement object can be performed.

A lever head of a tenth aspect of the present invention is the above-described lever head, in which the first to fourth elastic bodies are plate springs whose longitudinal directions correspond to the second direction, the plate springs having the same spring constant. As a result of this, rotational motion of the first and second elastic body attaching members is prevented, and the structure can be configured in which motion of the stylus support member is limited only in the first direction.

A lever head of an eleventh aspect of the present invention is the above-described lever head, in which the first to fourth elastic bodies are notch hinges whose longitudinal directions correspond to the second direction, the notch hinges having the same bending rigidity. As a result of this, rotational motion of the first and second elastic body attaching members is prevented, and the structure can be configured in which motion of the stylus support member is limited only in the first direction.

According to the present invention, a lever head can be provided that can perform accurate shape measurement with a simple configuration.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, an exemplary embodiment of the present invention will be explained with reference to drawings. In each drawing, the same symbol is given to the same component, and duplicate explanation is omitted if needed.

Figure 13:
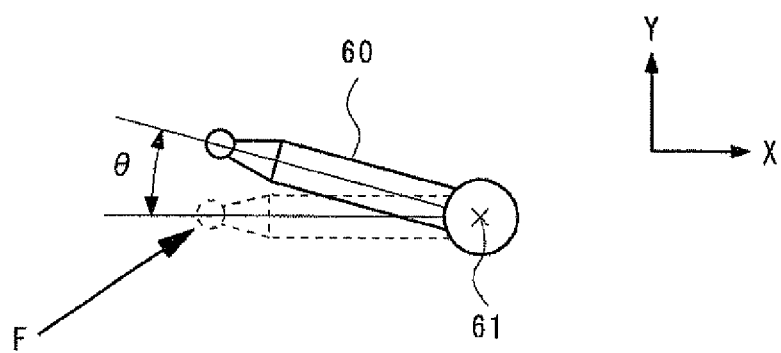
FIG. 13 is a view schematically showing a relation between an orbit and a displacement direction of a lever tip of a leverage-type detector.

First, an operating principle of a lever head will be explained as a premise for understanding the present invention. As shown in FIG. 13, rotational motion occurs in a leverage-type lever head at the time of measurement, and the lever head is displaced in X and Y directions. Therefore, as a pushing amount (an upward displacement amount in the Y direction) of a tip of the lever head becomes larger, a displacement amount of the tip of the lever head in a right direction on paper (X direction) of FIG. 13 becomes larger. As a result of it, in the leverage-type lever head, a problem occurs when a surface of a measurement object having unevenness is scanned.

Figure 1:
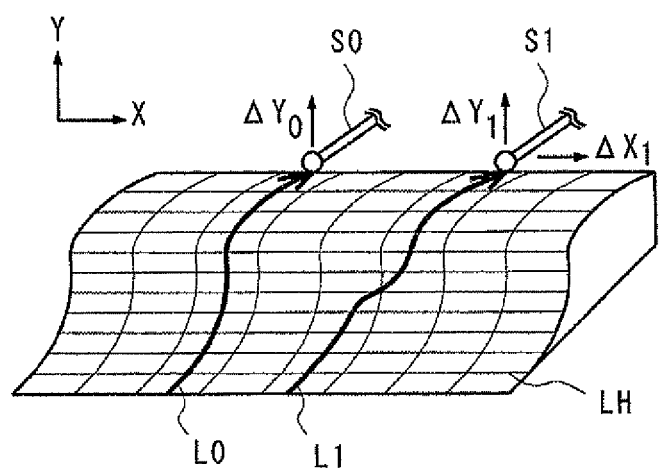
FIG. 1 is a perspective view schematically showing a trajectory of a tip of a lever head when the lever head scans a measurement object.

FIG. 1 is a perspective view schematically showing a trajectory of a stylus tip when a lever head scans a measurement object. In FIG. 1, a trajectory when a leverage-type lever head S1 scans a surface of a measurement object having unevenness is indicated as a trajectory L1. When a measuring surface having a gradient is scanned by the leverage-type lever head S1, displacement $\Delta X_1$ in the right direction becomes larger as displacement $\Delta Y_1$ in an upward direction becomes larger. Therefore, as shown in FIG. 1, the trajectory L1 deviates in the right direction along with progress of the scan. However, in order to measure a surface shape of the measurement object having unevenness, as a trajectory L0, it is necessary to scan along a path vertical to a contour line LH, and to obtain a displacement amount $\Delta Y_0$ only in the Y direction. That is, since the leverage-type lever head S1 deviates in the X direction from a path originally desired to scan, an error occurs in a measurement result only for the deviation. Since the error that occurs in the X direction is expressed by $\Delta X_1 = \Delta Y_0 \cos \theta$, it is referred to as a cosine error.

As described above, in order to accurately measure the surface shape of the measurement object having unevenness, it is desirable to use a direct acting type lever head shown with a symbol S0 in which a tip of the lever head is displaced only in the Y direction.

First Exemplary Embodiment

Figure 2:
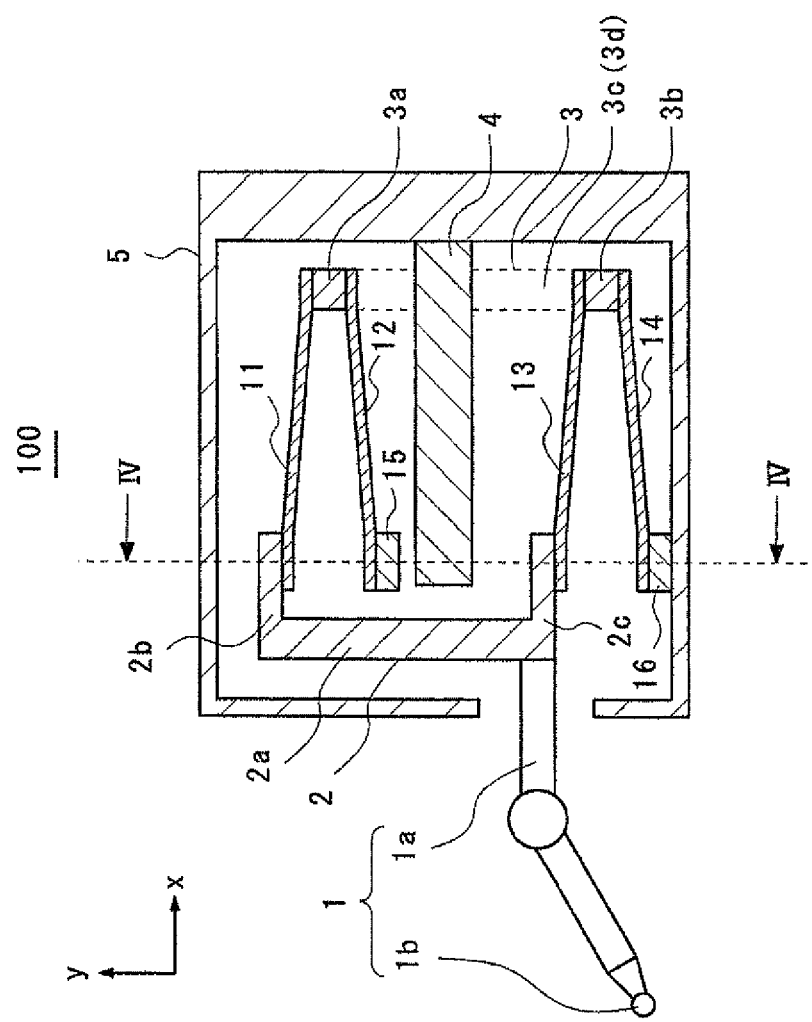
FIG. 2 is a cross-sectional view schematically showing a configuration of a lever head 100 according to a first exemplary embodiment.
Figure 3:
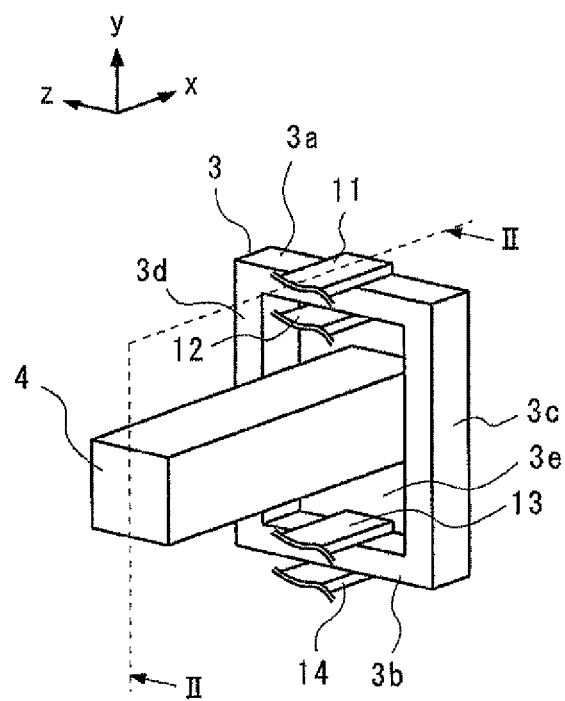
FIG. 3 is a perspective view schematically showing a configuration of an elastic body attaching member 3, a detector 4, and plate springs 11 to 14 of the lever head 100 according to the first exemplary embodiment.
Figure 4:
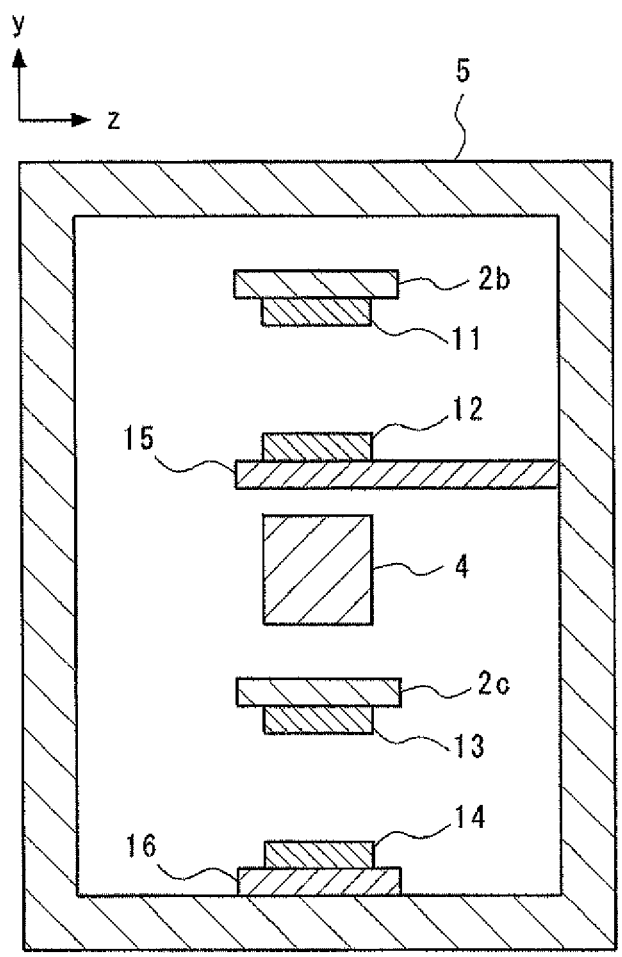
FIG. 4 is a cross-sectional view taken along a line IV-IV of FIG. 2 of the lever head 100 according to the first exemplary embodiment.

Hereinafter, the lever head 100 according to the first exemplary embodiment will be explained. FIG. 2 is a cross-sectional view schematically showing a configuration of the lever head 100 according to the first exemplary embodiment, FIG. 3 is a perspective view schematically showing a configuration of an elastic body attaching member 3, a detector 4, and plate springs 11 to 14 of the lever head 100 according to the first exemplary embodiment. It is to be noted that FIG. 2 represents a cross section taken along a line II-II shown in FIG. 3. FIG. 4 is a cross-sectional view taken along a line IV-IV of FIG. 2 of the lever head 100 according to the first exemplary embodiment.

The lever head 100 has: a stylus 1; a stylus support member 2; an elastic body attaching member 3; a detector 4; a holder 5; plate springs 11 to 14; and elastic body fixing members 15 and 16.

In the stylus 1, a base 1a extending in an x direction of FIG. 2 is joined to the stylus support member 2, and a tip 1b side projects outside from the holder 5. The stylus support member 2 has a member 2a (it is also referred to as a first member.) that extends in a y direction of FIG. 2. In the exemplary embodiment, the base 1a of the stylus 1 is joined as a cantilever extending in the x direction from a lower part of the extending member 2a. In addition, the stylus support member 2 has: a member 2b (it is also referred to as a second member.) that extends in the x direction from an upper end of the member 2a toward the elastic body attaching member 3; and a member 2c (it is also referred to as a third member.) that extends in the x direction from a lower end of the member 2a toward the elastic body attaching member 3. It is to be noted that hereinafter, the x direction, the y direction, and a z direction are dealt with as directions perpendicular to one another. In addition, the y direction is referred to as the first direction, the x direction is referred to as the second direction, and the z direction is referred to as the third direction, respectively.

The elastic body attaching member 3 is the member having an annular shape with the x direction being set as an axis, and is arranged spaced aside from the stylus support member 2 in the x direction. The elastic body attaching member 3 has an upper beam 3a and a lower beam 3b that extend in the z direction. It is to be noted that the upper beam 3a and the lower beam 3b are also referred to as first and second elastic body attaching members, respectively. The upper beam 3a and the lower beam 3b are arranged in parallel with each other. Respective ends of the upper beam 3a and the lower beam 3b are joined by members 3c and 3d. It is to be noted that the members 3c and 3d are also referred to as connecting members. Namely, the upper beam 3a, the lower beam 3b, and the members 3c and 3d are arranged so as to surround a hollow portion 3e. The members 3c and 3d are also referred to as first and second connecting members, respectively, and names of the first and second connecting members may be mutually replaced.

The detector 4 is joined as a cantilever that extends in the x direction from the holder 5 toward the stylus support member 2. It is to be noted that the detector 4 is arranged so as to penetrate through the hollow portion 3e of the elastic body attaching member 3. That is, it can be understood that the hollow portion 3e is provided to prevent the elastic body attaching member 3 and the detector 4 from interfering with each other.

The plate springs 11 to 14 are arranged so that main surfaces thereof are substantially vertical to the y direction, and longitudinal directions thereof correspond to the x direction. The plate springs 11 to 14 have the same material, the same thickness, and the same area as one another. Namely, plate springs having the same shape and the same spring constant are used for the plate springs 11 to 14. It is to be noted that the plate spring is only one example of an elastic body, and another elastic body can be used. The plate spring 11 is also referred to as a second elastic body. The plate spring 12 is also referred to as a first elastic body. The plate spring 13 is also referred to as a third elastic body. The plate spring 14 is also referred to as a fourth elastic body.

An upper surface of one end of the plate spring 11 is joined to a lower surface of the member 2b (a first joining position), and a lower surface of the other end is joined to an upper surface of the upper beam 3a of the elastic body attaching member 3 (a second attaching position). An upper surface of one end of the plate spring 12 is joined to a lower surface of the upper beam 3a of the elastic body attaching member 3 (a first attaching position), and a lower surface of the other end is joined to an upper surface of the elastic body fixing member 15. The elastic body fixing member 15 is fixed to the holder 5. Consequently, a position of an end on an elastic body fixing member 15 side of the plate spring 12 is fixed with respect to the holder 5.

That is, a joining portion of the plate spring 11 and the member 2b is opposed to a joining portion of the plate spring 12 and the elastic body fixing member 15 in the y direction. In addition, a joining portion of the plate spring 11 and the upper beam 3a is opposed to a joining portion of the plate spring 12 and the upper beam 3a in the y direction through the upper beam 3a. As a result of this, the plate springs 11 and 12, and the upper beam 3a of the elastic body attaching member 3 are included in a set of folded hinges folded at the upper beam 3a.

A lower surface of one end of the plate spring 13 is joined to an upper surface of the lower beam 3b of the elastic body attaching member 3 (a third attaching position), and an upper surface of the other end is joined to a lower surface of the member 2c (a second joining position). An upper surface of one end of the plate spring 14 is joined to a lower surface of the lower beam 3b of the elastic body attaching member 3 (a fourth attaching position), and a lower surface of the other end is joined to an upper surface of the elastic body fixing member 16. The elastic body fixing member 16 is fixed to the holder 5.

Consequently, a position of an end on an elastic body fixing member 16 side of the plate spring 14 is fixed with respect to the holder 5.

That is, a joining portion of the plate spring 13 and the member 2c is opposed to a joining portion of the plate spring 14 and the elastic body fixing member 16 in the y direction. In addition, a joining portion of the plate spring 13 and the lower beam 3b is opposed to a joining portion of the plate spring 14 and the lower beam 3b in the y direction through the lower beam 3b. As a result of this, the plate springs 13 and 14, and the lower beam 3b of the elastic body attaching member 3 are included in a set of folded hinges folded at the lower beam 3b.

Figure 5:
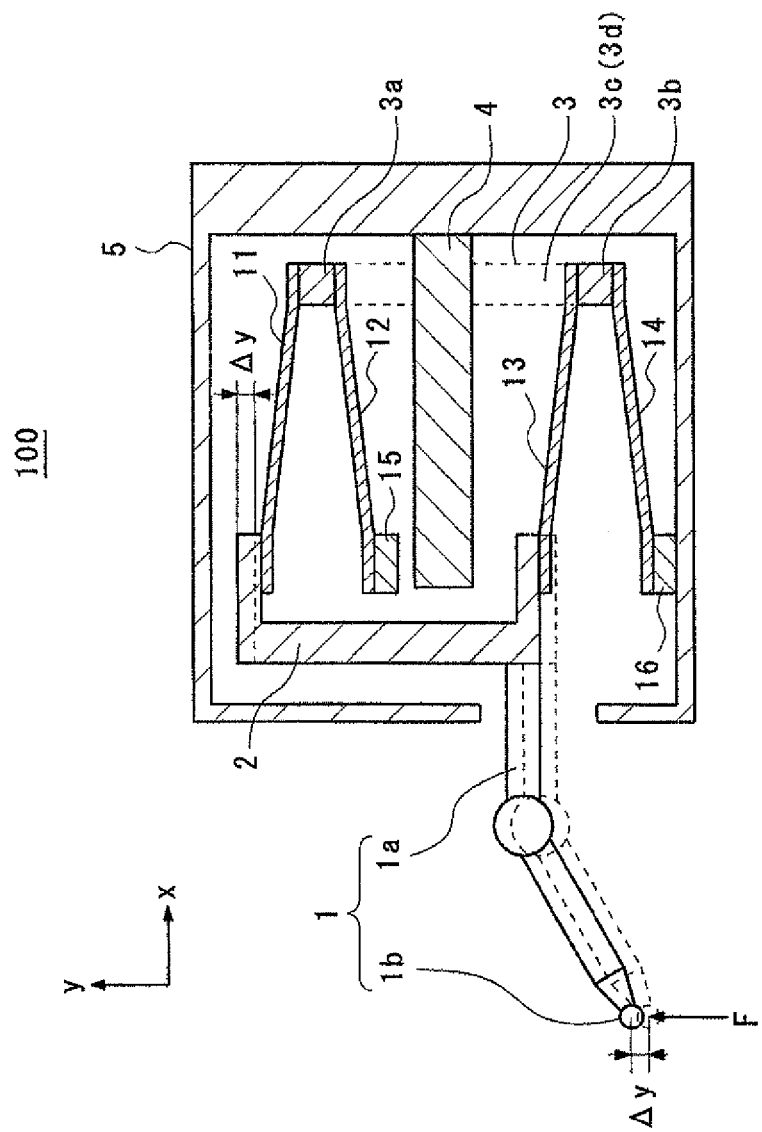
FIG. 5 is a cross-sectional view showing the lever head 100 when a measuring force is given to a tip 1$b$ of a stylus 1.

Subsequently, operation of the lever head 100 will be explained. When shape measurement of a measurement object is performed using the lever head 100, a measuring force is given to the tip 1b of the stylus 1. FIG. 5 is a cross-sectional view showing the lever head 100 when the measuring force is given to the tip 1b of the stylus 1. As shown in FIG. 5, when an upward measuring force F on paper is given to the tip 1b of the stylus 1, the tip 1b of the stylus 1 is upwardly displaced only by Δy. Accordingly, the stylus support member 2 to which the stylus 1 is fixed is also displaced. In this case, since the spring constants of the plate springs 11 to 14 are the same as one another, the same bending occurs in the plate springs 11 to 14. Furthermore, the plate springs 11 and 14 are fixed to the holder 5, and the plate springs 11 to 14 deform while relative positions of the upper beam 3a and the lower beam 3b are kept. Consequently, the plate spring 11 deforms in an opposite direction to the plate spring 12. In addition, the plate spring 13 deforms in an opposite direction to the plate spring 14.

As a result of it, the stylus support member 2 can be displaced only in the y direction. Consequently, the stylus support member 2 is displaced only upwardly by Δy similarly to the tip 1b of the stylus 1. In this case, displacement in the y direction of the elastic body attaching member 3 results in a half of Δy, which is a half of a displacement amount of the stylus support member 2.

The detector 4 then, for example, reads the displacement in the y direction of the stylus support member 2, and thereby a displacement amount Δy of the tip 1b of the stylus 1 can be calculated.

By the above, it can be understood that the lever head 100 operates as the direct acting type lever head in which the tip 1b of the stylus 1 is displaced only in the y direction. Additionally, the lever head 100 can achieve the direct acting type lever head by a simple configuration having the elastic bodies as the plate springs. As a result of this, it becomes possible to provide a lever head that is easily fabricated and is low in cost.

Comparative Example 1

Figure 6:
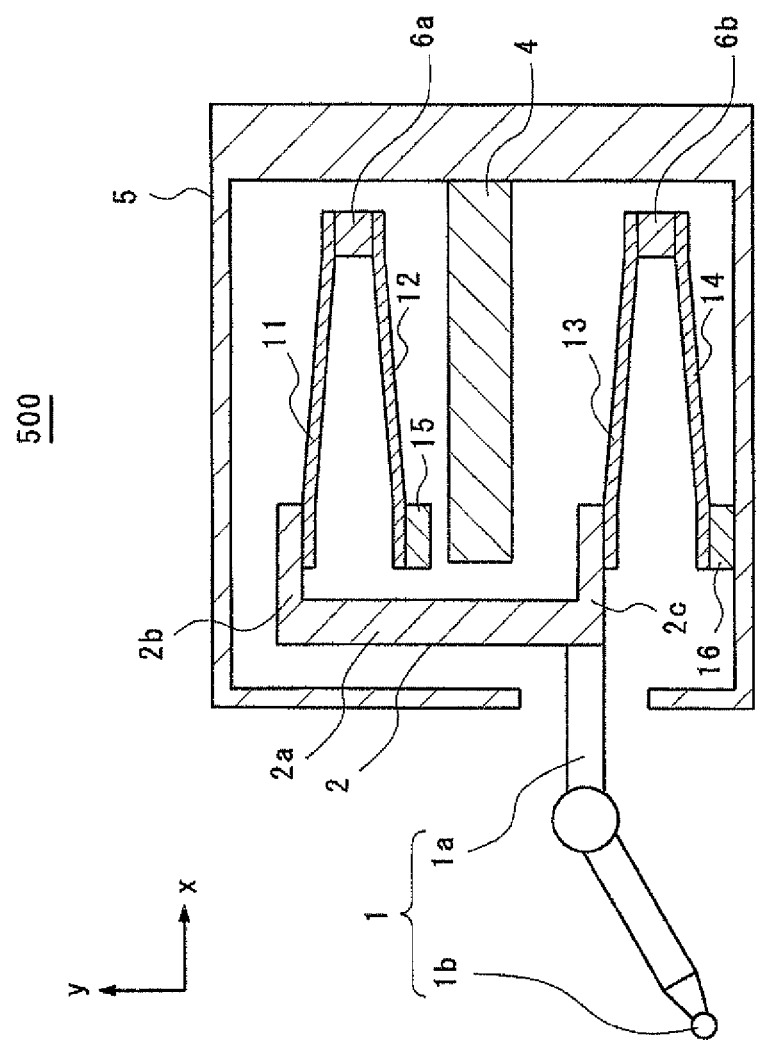
FIG. 6 is a cross-sectional view schematically showing a configuration of a lever head 500 according to a comparative example.
Figure 7:
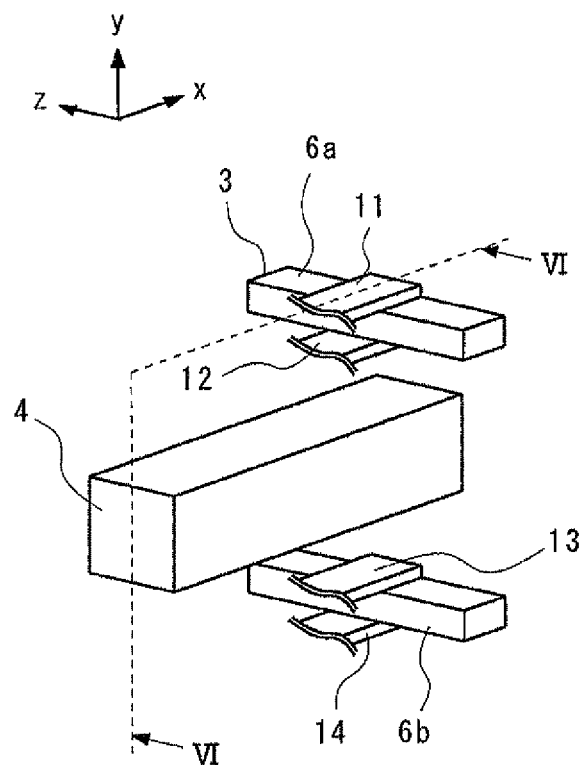
FIG. 7 is a perspective view schematically showing a configuration of a first elastic body attaching member 6$a$, a second elastic body attaching member 6$b$, the detector 4, and the plate springs 11 to 14 of the lever head 500 according to the comparative example.

Hereinafter, a lever head 500 according to a comparative example will be compared with the above-mentioned lever head 100, and a technical effect achieved by the lever head 100 will be examined. FIG. 6 is a cross-sectional view schematically showing a configuration of the lever head 500 according to the comparative example. FIG. 7 is a perspective view schematically showing a configuration of a first elastic body attaching member 6a, a second elastic body attaching member 6b, the detector 4, and the plate springs 11 to 14 of the lever head 500 according to the comparative example. It is to be noted that FIG. 6 represents a cross section taken along a line VI-VI shown in FIG. 7.

The lever head 500 has a configuration in which the elastic body attaching member 3 of the lever head 100 has been replaced by the first elastic body attaching member 6a and the second elastic body attaching member 6b. The first elastic body attaching member 6a has a configuration similar to the upper beam 3a of the elastic body attaching member 3 of the lever head 100. The second elastic body attaching member 6b has a configuration similar to the lower beam 3b of the elastic body attaching member 3 of the lever head 100. Namely, the first elastic body attaching member 6a and the second elastic body attaching member 6b are not connected to each other, and they are independent members, respectively. Since the other configurations of the lever head 500 are similar to those of the lever head 100, explanation thereof will be omitted.

Figure 8:
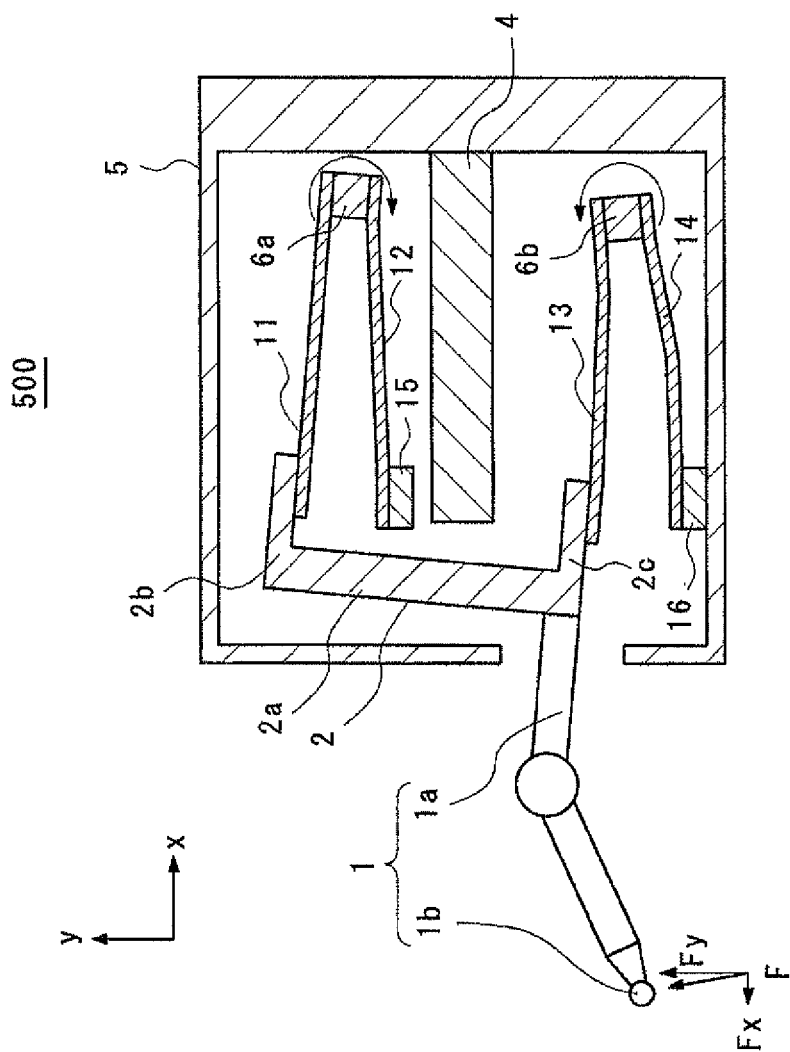
FIG. 8 is a cross-sectional view showing the lever head 500 when a measuring force is given to the tip 1$b$ of the stylus 1.

Subsequently, operation of the lever head 500 will be explained. When shape measurement of a measurement object is performed using the lever head 500, a measuring force is given to the tip 1b of the stylus 1. FIG. 8 is a cross-sectional view showing the lever head 500 when the measuring force is given to the tip 1b of the stylus 1. As shown in FIG. 8, when the measuring force F is given to the tip 1b of the stylus 1, the tip 1b of the stylus 1 is displaced. The measuring force F can be resolved into a force Fx in a horizontal direction and a force Fy in a vertical direction.

In addition, since the first elastic body attaching member 6a and the second elastic body attaching member 6b are independent of each other, they can rotate with the z direction vertical to paper of FIG. 8 being set as an axis. In other words, the above means that the first elastic body attaching member 6a and the second elastic body attaching member 6b have one degree of freedom in a rotational direction more than the upper beam 3a and the lower beam 3b.

Consequently, right-handed rotation is generated in the first elastic body attaching member 6a. In addition, left-handed rotation is generated in the second elastic body attaching member 6b. As a result of this, right-handed rotation is generated in the stylus support member 2. As a result of it, since the tip 1b of the stylus 1 follows an arc-like orbit, the above-mentioned cosine error is generated, thus causing degradation of measurement accuracy.

In contrast with this, in the lever head 100 according to the first exemplary embodiment, the upper beam 3a and the lower beam 3b are connected to each other, and they are configured as an integrated member. As a result of this, a right-handed rotational force applied to the upper beam 3a and a left-handed rotational force applied to the lower beam 3b are offset through the members 3c and 3d. As a result of it, the upper beam 3a and the lower beam 3b do not rotate. That is, unlike the first elastic body attaching member 6a and the second elastic body attaching member 6b, the upper beam 3a and the lower beam 3b do not have degrees of freedom in rotational directions.

In other words, it can also be understood that in the lever head 100, the cosine error caused in the first elastic body attaching member 6a of the lever head 500 is canceled by a cosine error in an opposite direction caused in the second elastic body attaching member 6b.

As a result of this, displacement of the stylus support member 2 can be limited only to the y direction.

Second Exemplary Embodiment

Figure 9:
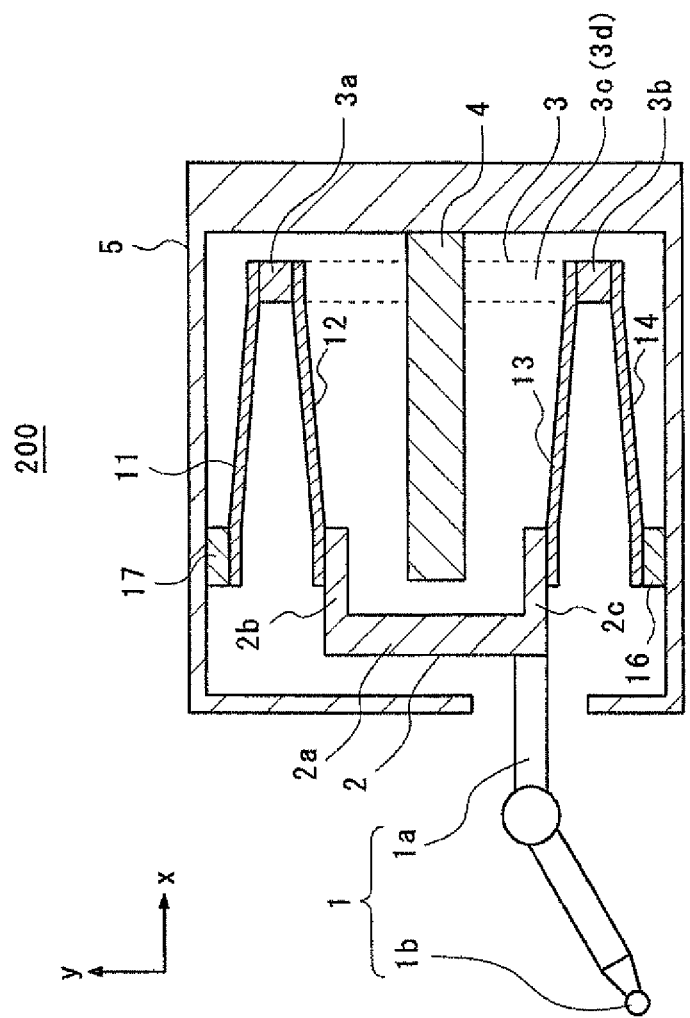
FIG. 9 is a cross-sectional view schematically showing a configuration of a lever head 200 according to a second exemplary embodiment.

Next, a lever head 200 according to a second exemplary embodiment will be explained. FIG. 9 is a cross-sectional view schematically showing a configuration of the lever head 200 according to the second exemplary embodiment. The lever head 200 has a configuration in which the elastic body fixing member 15 of the lever head 100 has been replaced by an elastic body fixing member 17.

The upper surface of one end of the plate spring 11 is joined to a lower surface of the elastic body fixing member 17, and the lower surface of the other end is joined to the upper surface of the upper beam 3a of the elastic body attaching member 3. The upper surface of one end of the plate spring 12 is joined to an upper surface of the member 2b, and the lower surface of the other end is joined to the lower surface of the upper beam 3a of the elastic body attaching member 3. The elastic body fixing member 17 is fixed to the holder 5. Consequently, a position of an end on an elastic body fixing member 17 side of the plate spring 12 is fixed with respect to the holder 5. Since the other configurations of the lever head 200 are similar to those of the lever head 100, explanation thereof will be omitted.

In the configuration, although a joining relation of the stylus support member 2, and the plate springs 11 and 12 differs from the lever head 100, the plate springs 11 to 14 can perform similar operation to the lever head 100. Consequently, according to the configuration, a lever head that performs similar operation to the lever head 100 can be provided.

Third Exemplary Embodiment

Figure 10:
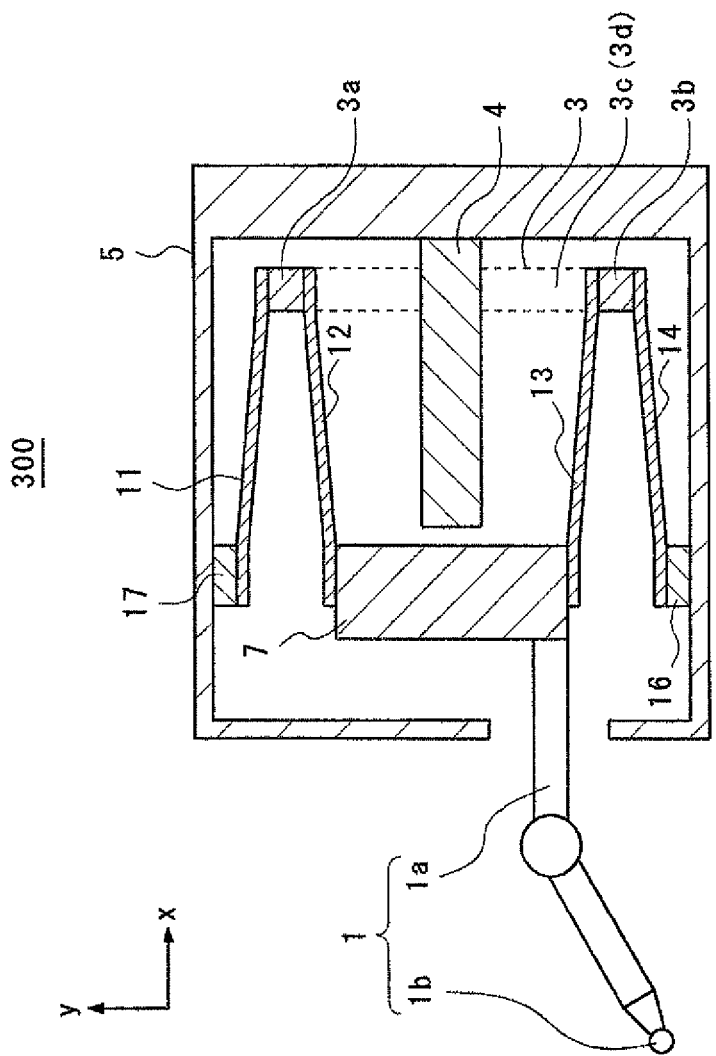
FIG. 10 is a cross-sectional view schematically showing a configuration of a lever head 300 according to a third exemplary embodiment.

Next, a lever head 300 according to a third exemplary embodiment will be explained. FIG. 10 is a cross-sectional view schematically showing a configuration of the lever head 300 according to the third exemplary embodiment. The lever head 300 has a configuration in which the stylus support member 2 of the lever head 200 has been replaced by a stylus support member 7.

The stylus support member 7 has a similar shape to the member 2a, while the members 2b and 2c project in the x direction from the member 2a in the stylus support member 2. Additionally, the plate spring 12 is joined to an upper surface of the stylus support member 7, and the plate spring 13 is joined to a lower surface of the stylus support member 7. Since the other configurations of the lever head 300 are similar to those of the lever head 200, explanation thereof will be omitted.

In the configuration, although a shape of the stylus support member 7 differs from that of the stylus support member 2 of the lever head 200, the plate springs 11 to 14 can perform similar operation to the lever head 200. Consequently, according to the configuration, a lever head that performs similar operation to the lever head 200 can be provided.

Fourth Exemplary Embodiment

Figure 11:
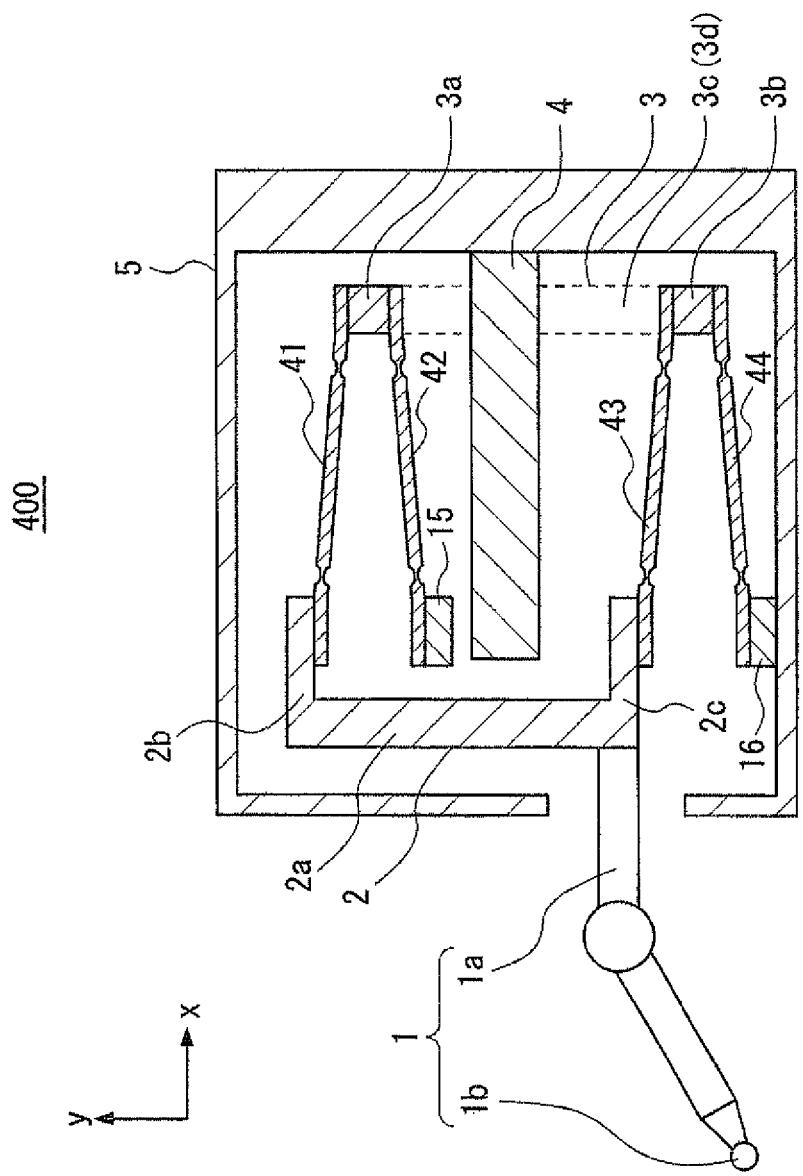
FIG. 11 is a cross-sectional view schematically showing a configuration of a lever head 400 according to a fourth exemplary embodiment.

Next, a lever head 400 according to a fourth exemplary embodiment will be explained. FIG. 11 is a cross-sectional view schematically showing a configuration of the lever head 400 according to the fourth exemplary embodiment. The lever head 400 has a configuration in which the plate springs 11 to 14 of the lever head 100 have been replaced by notch elastic hinges 41 to 44, respectively.

Bending is caused at two bending portions in the notch elastic hinges 41 to 44. As a result of it, the notch elastic hinges 41 and 42, and the notch elastic hinges 43 and 44 are included in a so-called pantograph structure. That is, the notch elastic hinges 41 to 44 perform lever motion of the single degree of freedom with the z direction being set as the axis of rotation similarly to the plate springs 11 to 14, and can limit displacement of the stylus support member 2 only in the y direction.

As described above, in the configuration, the notch elastic hinges 41 to 44 can exert a similar effect to the plate springs 11 to 14. Consequently, according to the configuration, a lever head that performs similar operation to the lever head 100 can be provided.

Figure 12:
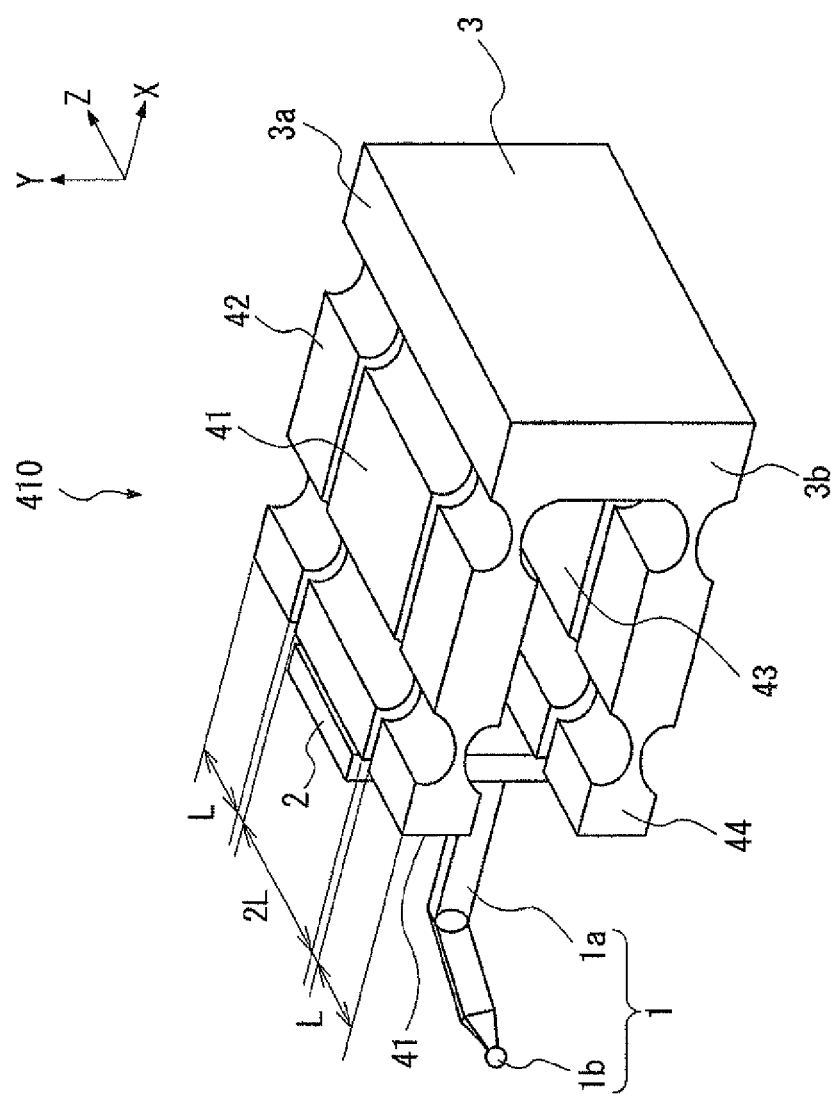
FIG. 12 is a perspective view schematically showing a configuration of a lever head 410 that is a variation of fourth embodiment.

Note that the notch elastic hinges 41 and 42 can be configured in a same plain, and the notch elastic hinges 43 and 44 can be configured in a same plain. FIG. 12 is a perspective view schematically showing a configuration of a lever head 410 that is a variation of fourth embodiment. As shown in FIG. 12, one notch elastic hinge 41 and two notch elastic hinges 42 are configured in a same plain. A z-direction width of the notch elastic hinge 41 is 2 L. Z-direction width of the notch elastic hinge 42 is L. Therefore, the spring constant of one notch elastic hinge 43 is the same as the total spring constant of two notch elastic hinges 44. Likewise, a z-direction width of the notch elastic hinge 43 is 2 L. Z-direction width of the notch elastic hinge 44 is L. Therefore, the spring constant of one notch elastic hinge 41 is the same as the total spring constant of two notch elastic hinges 42. Since other configurations of the lever head 410 are similar to those of the lever head 400, explanation thereof will be omitted. As a result, the lever head 410 functions in the same manner as the lever head 400.

Other Exemplary Embodiments

It is to be noted that the present invention is not limited to the above-described exemplary embodiments, and that changes can be appropriately made without departing from the spirit of the invention. For example, although in the above-mentioned exemplary embodiments, the plate springs 11 to 14 and the notch elastic hinges 41 to 44 have been explained as the elastic bodies that perform lever motion of the single degree of freedom with the z direction being set as the axis of rotation, they are mere exemplifications. Consequently, as long as lever motion of the single degree of freedom with the z direction being set as the axis of rotation is performed, other elastic bodies are applicable.

It goes without saying that the plate springs 11 to 14 of the lever heads 200 and 300 can be replaced by the notch elastic hinges 41 to 44.

Although in the above-mentioned exemplary embodiments, a case where the elastic body attaching member 3 has the hollow portion 3e, it is a mere exemplification. For example, the elastic body attaching member can be configured to have only one of the members 3c and 3d. Namely, as long as rotation of the member corresponding to the upper beam 3a and the lower beam 3b can be prevented, another configuration is applicable.

From the invention thus described, it will be obvious that the exemplary embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A lever head comprising:
a holder;
a stylus support member that extends in a first direction;
a stylus that is fixed to the stylus support member, and extends in a second direction;
a first elastic body attaching member that is arranged spaced aside from the stylus support member in the second direction;
a second elastic body attaching member that is arranged spaced aside from the stylus support member in the second direction, and is arranged spaced aside from the first elastic body attaching member in the first direction;

first and second connecting members that connect the first and second elastic body attaching members to fix relative positions of the first and second elastic body attaching members;

a first elastic body having one end that is fixed to the holder, and having another end that is joined to a first attaching position of the first elastic body attaching member;

a second elastic body having one end that is joined to a first joining position of the stylus support member, and having another end that is joined to a second attaching position opposed to the first attaching position in the first direction through the first elastic body attaching member;

a third elastic body having one end that is joined to a second joining position spaced aside from the first joining position of the stylus support member in the first direction, and having another end that is joined to a third attaching position of the second elastic body attaching member;

a fourth elastic body having one end that is fixed to the holder, and having another end that is joined to a fourth attaching position opposed to the third attaching position in the first direction through the second elastic body attaching member; and a detector that detects displacement in the first direction of the stylus support member, wherein:

the first to fourth elastic bodies perform lever motion of a single degree of freedom with a third direction perpendicular to the first and second directions being set as an axis, the first and second elastic body attaching members extend in the third direction, the first and second connecting members extend in the first direction and connect the first and second elastic body attaching members, the first connecting member connects a first end of the first elastic body attaching member, and a second end of the second elastic body attaching member corresponding to the first end, the second connecting member connects a third end of the first elastic body attaching member on an opposite side of the first end, and a fourth end of the second elastic body attaching member corresponding to the third end, and a hollow portion surrounded by the first and second elastic body attaching members, and the first and second connecting members is formed.

2. The lever head according to claim 1, wherein:
the first and second elastic bodies, and the first elastic body attaching member are included in a first folded hinge, and
the third and fourth elastic bodies, and the second elastic body attaching member are included in a second folded hinge.

3. The lever head according to claim 1, wherein the stylus support member includes:
a first member that extends in the first direction;
a second member that projects in a second direction from one end of the first member; and
a third member that projects in the same direction as the second member from the other end of the first member, and wherein:
the second elastic body is joined to a surface on a side of the third member of the second member, and
the third elastic body is joined to a surface of the third member on an opposite side of the second member.

4. The lever head according to claim 1, wherein the stylus support member includes:
a first member that extends in the first direction;
a second member that projects in a second direction from one end of the first member; and
a third member that projects in the same direction as the second member from the other end of the first member, and wherein:
the second elastic body is joined to a surface of the second member on an opposite side of the third member, and
the third elastic body is joined to a surface of the third member on an opposite side of the second member.

5. The lever head according to claim 1, wherein:
the stylus support member includes a first member that extends in the first direction, and
the second elastic body is joined to one end of the first member, and
the third elastic body is joined to the other end of the first member.

6. The lever head according to claim 1, wherein the detector is configured as a cantilever that penetrates through the hollow portion to extend in the second direction, the cantilever being fixed to the holder.

7. The lever head according to claim 1, wherein the first to fourth elastic bodies are plate springs having longitudinal directions that correspond to the second direction, the plate springs having the same spring constant.

8. The lever head according to claim 1, wherein the first to fourth elastic bodies are notch hinges having longitudinal directions that correspond to the second direction, the notch hinges having the same bending rigidity.

* * * * *